Sept. 6, 1966

T. C. ANDERSON ET AL  3,271,666

APPARATUS FOR MEASURING ENVELOPE DELAY DISTORTION WHEREIN
SELECTED IMPULSES OF A HIGH FREQUENCY STANDARD ARE GATED
TO ONE INPUT OF A BISTABLE PHASE COMPARATOR

Filed Dec. 21, 1964

INVENTORS  T. C. ANDERSON
           D. L. FAVIN
BY
R. O. Nimtz
ATTORNEY

3,271,666
APPARATUS FOR MEASURING ENVELOPE DELAY DISTORTION WHEREIN SELECTED IMPULSES OF A HIGH FREQUENCY STANDARD ARE GATED TO ONE INPUT OF A BISTABLE PHASE COMPARATOR
Theodore C. Anderson, Morristown, and David L. Favin, Whippany, N.J., assignors to Bell Telephone Laboratories, Incorporated, New York, N.Y., a corporation of New York
Filed Dec. 21, 1964, Ser. No. 419,864
23 Claims. (Cl. 324—57)

This invention relates to apparatus for measuring phase and delay in electrical communications systems or networks, and, more particularly, to apparatus for measuring envelope delay distortion, that is, changes in envelope delay, in such systems or networks.

One of the important characteristics in transmission circuits, particularly in pulse transmission systems, which must be measured is the envelope delay distortion. Envelope delay is equal to the slope of the phase versus frequency characteristic of the system. Ideally, the envelope delay is constant, that is, the slope of the phase versus frequency characteristic is linear throughout the entire frequency range. Deviations or changes in the envelope delay throughout the frequency range is defined as the envelope delay distortion.

If a low frequency signal is caused to amplitude modulate a high frequency carrier, and the carrier and the two resulting sidebands are sent over the system or network to be measured, each sideband and the carrier will experience a delay in accordance with its respective position in the frequency spectrum. Full wave rectification of the signal at the output of the system or network produces a signal which is shifted in phase from the low frequency modulating signal by $\Delta\Phi/2$, where $\Delta\phi$ is the phase difference between the upper and lower sideband frequencies (assuming that the phase versus frequency function is continuous). If the low frequency signal has a frequency (in radians/sec.) which is fixed at a value of $\Delta\omega/2$, the sidebands will be $\Delta\omega$ apart in the frequency spectrum, and measurement of the phase difference between the modulating signal and the signal derived by demodulation will provide the usual approximation, $\Delta\Phi/\Delta\omega$, to the actual envelope delay, $d\Phi/d\omega$. Measured changes in the ratio $\Delta\phi/\Delta\omega$ as the high frequency carrier is varied over the frequency range of interest will, in turn, provide a measurement of the envelope delay distortion.

Because of irregularities in the phase versus frequency characteristic to obtain a good approximation of $d\phi/d\omega$, $\Delta\omega$ should be made as small as possible. In addition, if the envelope delay distortion is to be measured by actually measuring the changes in $\Delta\Phi$ over the entire frequency range of interest, $\Delta\omega$ should be essentially constant. In other words, the high frequency carrier must be modulated by a highly stable very low frequency signal. For the very low frequencies which are required in view of the phase characteristics irregularities (less than 100 cycles), simple circuits with the required order of stability have been difficult to obtain.

One technique in the prior art for measuring envelope delay distortion has been to develop the low frequency modulating signal from a relatively higher but very stable oscillator such as a tuning fork oscillator. Voltage impulses are developed at a predetermined phase of each cycle of the higher frequency signal and divided down to produce a quasi-square wave signal at the low frequency rate from which the low frequency modulating signal is extracted. Voltage impulses at the zero crossings of the low frequency signal are applied to one input of a flip-flop phase comparator, the other input of which is connected to receive impulses at the zero crossings of the phase-shifted low frequency signal. A change in the duty cycle of the flip-flop phase comparator indicates a change in the phase difference between the two low frequency signals and therefore a change in envelope delay. This technique is utilized in the envelope delay measuring instrument by W. D. Cannon shown in Transactions of the American Institute of Electrical Engineers, Communications and Electronics, 1955, pages 710–717. Apparatus utilizing this technique has the disadvantage of working the flip-flop phase comparator in an unstable region for phase differences around 0 and multiples of 360 degrees. These phase differences call for the simultaneous application of the impulses from each of the signals. As a result, small erratic shifts in either of the pulses will cause the flip-flop to fluctuate in an attempt to meet the impossible demand of being constntly on both sides.

One object of the present invention is to provide envelope delay distortion measuring apparatus wherein the high frequency carrier is amplitude-modulated by a highly stable but very low frequency signal.

Another object of the present invention is to provide an envelope delay distortion measuring apparatus wherein the flip-flop phase comparator is operated about its stable 50% duty cycle for all measured phase differences including 0 and 360°.

These and other objects are accomplished in one embodiment of the invention wherein a highly stable tuning fork oscillator is utilized to provide voltage impulses which is turn are divided down to produce the low frequency modulating signal. The higher frequency voltage impulses are also advantageously coupled to the standard side of the bistable phase comparator by means of a selective gate circuit, thereby providing known accurate steps in phase. As a result, the phase comparator is caused to operate about its stable 50% duty cycle even for phase shifts which are multiples of 360°.

One feature of this invention is the use of a logarithmic compressor preceding full wave rectification in order to insure a lower amplitude-to-phase conversion, that is, to insure that the effects of gain variations in the system on the measured phase differences will be at a minimum.

Another feature of this invention is the use of a compensation circuit associated with the phase comparator which substantially eliminates the effects of existing delay distortion within the measuring apparatus itself. As a result, the invention provides measuring apparatus which is more efficient and economical than was heretofore possible in the art.

The objects and advantages of the invention will be more clearly understood from a consideration of the following specification in connection with the attached drawings in which.

Figure 1:
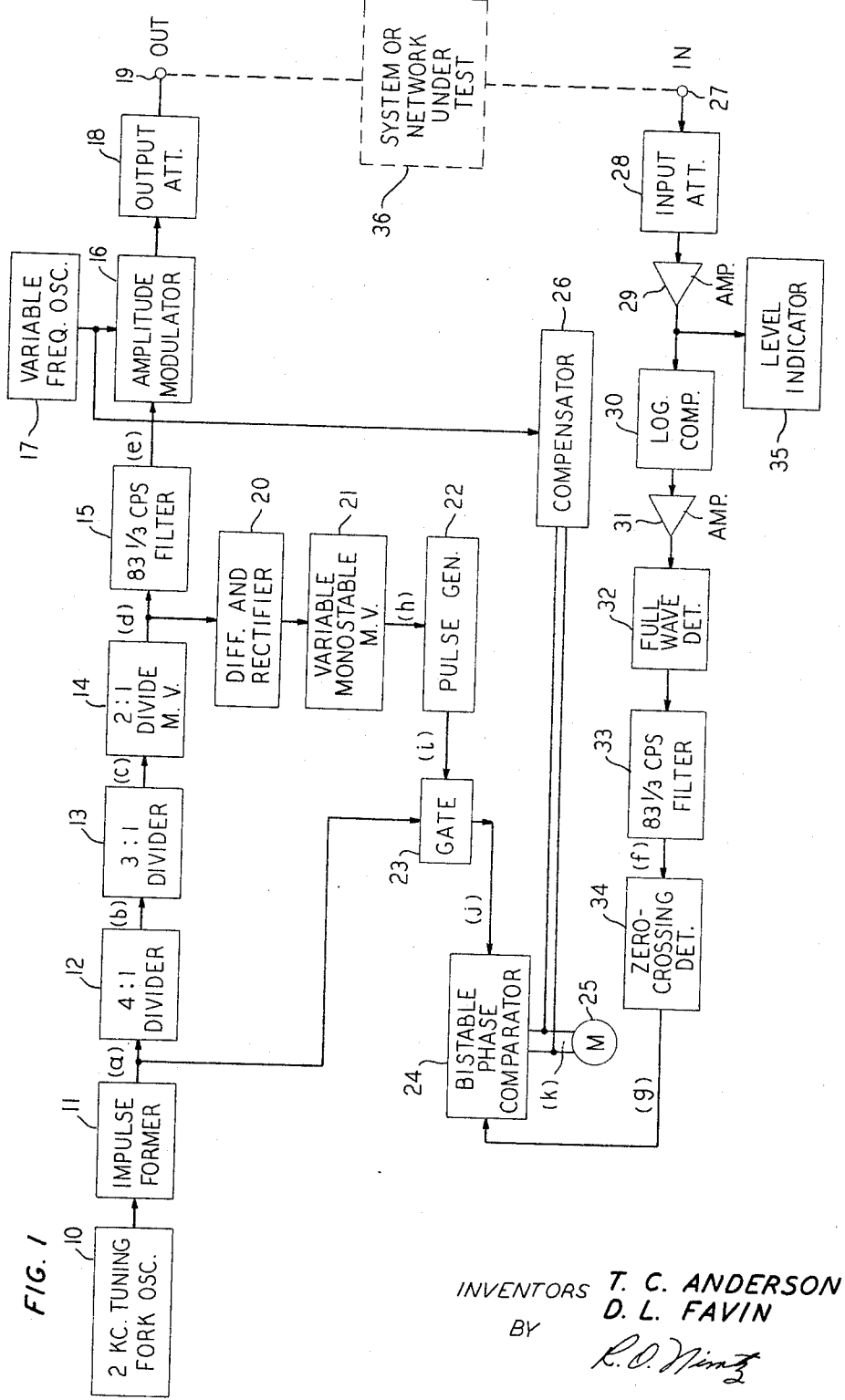
FIG. 1 is a block diagram of an envelope delay distortion measuring circuit constructed in accordance with the present invention.
Figure 2:
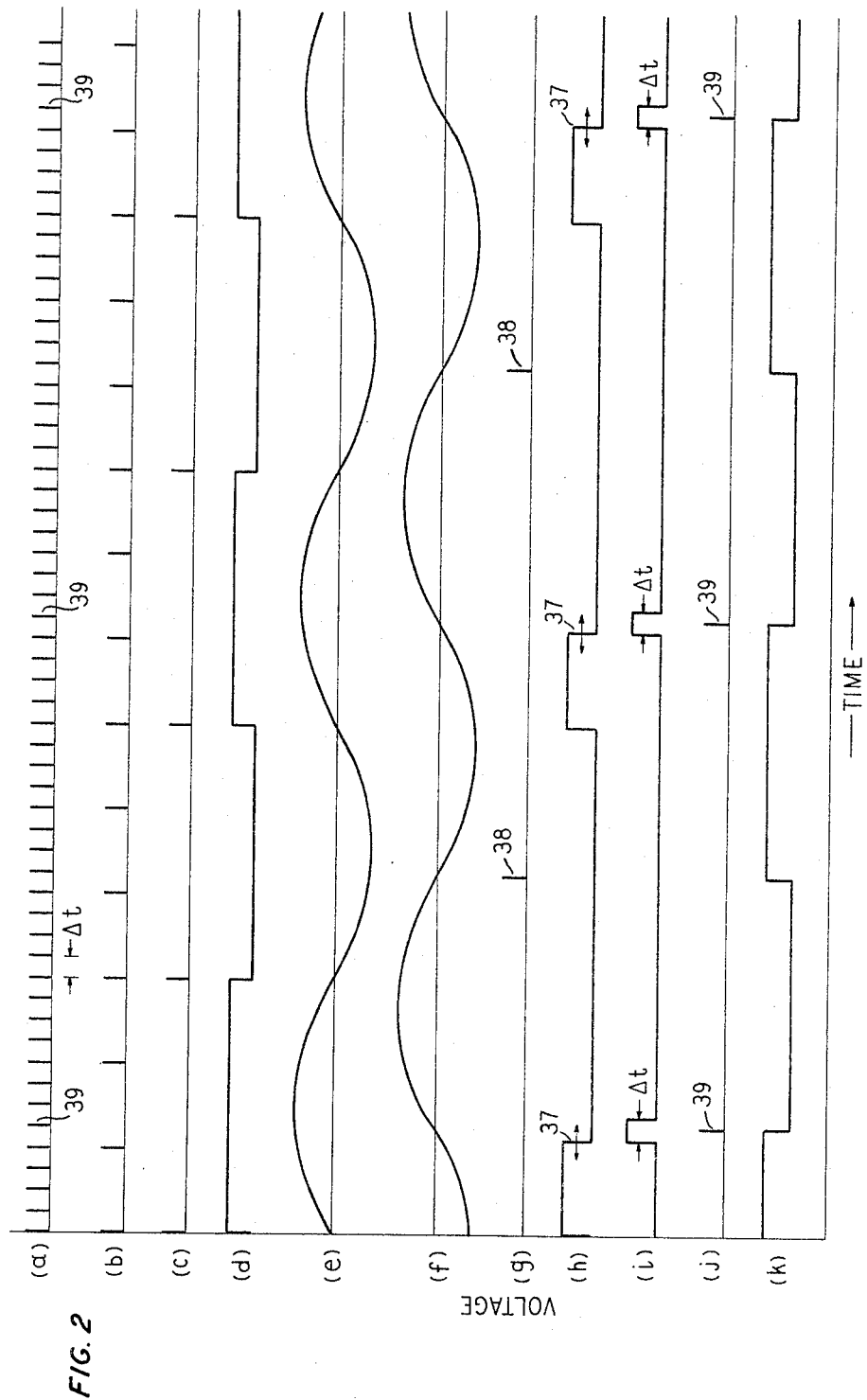
FIG. 2 is a series of illustrative voltage wave shapes at different points in the circuit of FIG. 1.

In FIG. 1 there is shown a block diagram of an envelope delay distortion measuring apparatus which illustrates the principles of the invention. Oscillator 10 is a source of sinusoidal voltage chosen to meet the frequency stability requirement mentioned hereinabove in connection with the short and long term stability of the frequency spacing between the developed amplitude-modulated sidebands. In order to meet this requirement, an oscillator providing oscillations at a frequency much higher than one-half the sideband spacing must be chosen. For illustrative purposes, oscillator 10 has been designated as a 2 kc. tuning fork oscillator. The output of oscillator 10 is coupled to impulse former 11 which provides a voltage impulse at the same predetermined phase of each cycle at its input. The voltage waveform (a) in FIG. 2 illustrates the train of voltage impulses at the output of impulse former 11. Any one of many well-known circuits may be utilized to perform the function of impulse former 11; for example, the sinusoidal variations from oscillator 10 may be amplified, amplitude limited and differentiated to provide voltage impulses of one polarity at either the negative-going or positive-going zero crossing of the sinusoidal voltage variations. As will be appreciated hereinafter, these voltage impulses need not occur at any specific phase of the sinusoidal voltage but need only occur at the same phase throughout the entire measurement such that the spacing between voltage impulses at the output of impulse former 11 remains constant.

Divider 12 takes the impulse train from impulse former 11 and performs a 4:1 division, that is to say, divider 12 allows only one impulse out of every four from impulse former 11 to appear at its output, as shown in the waveform (b) of FIG. 2. Any one of a wide variety of synchronized relaxation oscillators may be used for this purpose. In a similar fashion, divider 13 provides a 3:1 division as shown in the waveform (c) of FIG. 2. The voltage impulses from divider 13 are fed to a bistable multivibrator, shown as divider 14, which provides a further division of 2:1. The voltage impulses from divider 13, having a repetition rate of 166⅔ pulses per second, are converted by divider 14 to a square wave having a repetition rate of 83⅓ pulses per second. The square wave from divider 14 is converted to sinusoidal voltage waveform (e) in FIG. 2, having the same period as the square wave by passing the square wave through low-pass 83⅓ cycles per second filter 15.

Variable frequency oscillator 17 is chosen to provide signals throughout the frequency range for which measurements of delay distortion are desired. The output from oscillator 17 and the output from filter 15 are applied to amplitude modulator 16. The signal at the output of modulator 16 comprises a carrier and two sidebands each of which is displaced from the carrier by a frequency equal to that of the low frequency modulating signal. This amplitude-modulated signal is coupled through output attenuator 18 to output terminal 19 which in turn is coupled to the system or network 36 to be measured.

The signal at the output of the measured system or network 36 is coupled to input 27. Each of the three frequency components of this signal is shifted in phase by an amount corresponding to the phase response of the measured system at the frequency. This received signal is coupled from input 27 through input attenuator 28 to amplifier 29.

Level indicator 35 is connected to the output of amplifier 29. This indicator circuit may be simply a rectifier plus direct-current meter whose reading indicates the amplitude of the modulated signal at the output of amplifier 29. Input attenuator 28 is adjusted to cause the meter, in level indicator 35, to read on scale. A knowledge of the signal level at output 19, the amount of attenuation in attenuator 28, plus the reading on the level indicator 35 gives a measure of the gain or loss of the system under measurement. For convenience of operation and simplicity of attenuator 28, the operator is not compelled to adjust attenuator 28 until a standard reading is obtained on level indicator 35. As a result, received signals of various levels are permitted to occur at the output of amplifier 29, and the peak-to-trough amplitude of these signals will depend on the particular received level. Accordingly, direct demodulation of these signals would result in demodulated signals of various amplitudes. It is desirable, for reasons to be considered hereinafter, to maintain a constant amplitude signal after demodulation. Accordingly, it would be advantageous at this point to maintain the peak-to-trough amplitude of the modulated wave at a constant value, especially since limiting of the envelope amplitude can be done at these carrier frequencies without introducing any appreciable phase shift in the envelope in contrast to limiting done after demodulation at the contrast to limiting done after demodulation at the envelope frequency.

A simple mathematical analysis will show that a circuit whose output is a logarithmic function of its input will provide a signal at its output whose peak-to-trough amplitude is substantially constant even though the amplitude-modulated signal presented to its input is permitted to change in amplitude. For example, if A is the peak amplitude of the carrier signal without modulation, and m is the index of modulation, the amplitude of the modulated signal $$e_{in} \text{ (peak)} = A(1+m)$$
$$e_{in} \text{ (trough)} = A(1-m)$$

If the signal is passed through a circuit having the characteristic of $$e_{out} = K \log (e_{in})$$
$$e_{out} \text{ (peak)} = K[\log A + \log (1+m)]$$
$$e_{out} \text{ (trough)} + K[\log A + \log (1-m)]$$

The peak-to-trough amplitude of the output equals $$e_{out} \text{ (peak)} - e_{out} \text{ (trough)} = K \log \left(\frac{1+m}{1-m}\right)$$

which is not a function of A and therefore not subject to variations in A. Logarithmic compressor 30 therefore has the function of maintaining the peak-to-trough amplitude of the modulated wave at a constant value. A circuit which provides a logarithmic characteristic over a limited but sufficient range is shown in FIG. 3.

Figure 3:
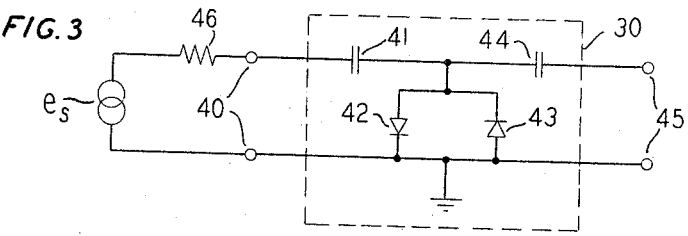
FIGS. 3 and 4 are schematic diagrams of specific circuits which may be utilized in two of the blocks of the circuit of FIG. 1.

Referring now to FIG. 3, a signal applied at input 40 is coupled through capacitor 41 to a parallel arrangement of oppositely poled diodes 42 and 43. As is well known in the art, a diode in its forward-bias condition produces a voltage across it which is essentially a logarithmic function of the current through the diode. Accordingly, each diode in its forward-biased condition, one for positive swings of the applied signal and the other for negative swings of the applied signal, works against a relatively higher source impedance 46 to provide, to output terminals 45 through coupling capacitor 44, an output signal which is approximately the logarithm of the signal applied to input 40. Consequently, the modulated signal applied to amplifier 31 in FIG. 1 has a substantially constant peak-to-trough amplitude even though signals of different level are presented to the input of logarithmic compressor 30.

Returning to FIG. 1, amplifier 31, having a constant gain throughout the frequency range of interest, improves demodulation efficiency by amplifying the amplitude-modulated signal before presentation of the signal to full wave detector 32. Detector 32 demodulates the signal presented at its input and recovers the 83⅓ cycle per second phase-shifted low frequency signal. Other modulation products are rejected by the narrow band-pass filter 33 so that the only signal present at the output of filter 33 is an 83⅓ cycle per second signal, shifted in phase by an amount $\Delta\Phi/2$ where $\Delta\Phi$ is the difference in phase encountered by the upper sideband and the lower sideband in passing through the system under measurement. The output of filter 33, shown as waveform (f) in FIG. 2, must now be compared to the original modulating low frequency signal (e) shown in FIG. 2 in order to determine the changes in $\Delta\Phi$ encountered when the frequency from oscillator 17 is varied.

Zero crossing detector 34 in FIG. 1 produces voltage impulses shown as 38 in (g) of FIG. 2 at the negative-going zero crossings of the sinusoidal signal appearing at the output of filter 33. Any one of a wide variety of prior art circuits may be utilized for this purpose. For example, the sinusoid may be amplified, amplitude limited, differentiated, and clipped in order to produce voltage impulses at the negative-going zero crossing. All of these circuits for delevoping voltage impulses at a predetermined phase of a sinusoidal signal are dependent to varying degrees on the amplitude of the signal presented, that is, the precise phase at which the voltage impulse appears is to some degree dependent on the amplitude of the applied sinusoidal signal. In the art, this sensitivity to amplitude variations is termed amplitude-to-phase conversion. In the apparatus shown in FIG. 1, the amplitude-to-phase conversion is reduced to a minimum regardless of the type zero crossing detector employed by the hereinabove described action of logarithmic compressor 30 which insures that a relatively constant amplitude sinusoidal voltage is presented to the input of detector 34. The impulses from detector 34 are coupled to one input of bistable phase comparator 24 which consists of a bistable multivibrator having output terminals for providing a rectangular wave shown as waveform (k) in FIG. 2. Meter 25 connected to these output terminals responds to the direct-current component of waveform (k) in FIG. 2 to indicate deviations of bistable phase comparator 24 from its 50% duty cycle.

The standard or other side of bistable phase comparator 24 is not connected as in prior art circuits to a circuit which produces impulses at the positive- or negative-going zero crossings of the low frequency signal at the output of filter 15. To do so would cause unstable operation of comparator 24 for at least one of the phase shifts encountered. For example, assume that the standard side of comparator 24 were fed by voltage impulses at the negative-going zero crossings of the sinusoid at the output of filter 15. When the sinusoid at the output of filter 33 has encountered a phase shift equal to a multiple of 360°, simultaneous voltage impulses would be applied to bistable phase comparator 24 and the comparator would not be able to decide whether to remain constantly on one side or on the other. Similarly, if the standard side of the comparator 24 were fed by voltage impulses which occur at the positive-going zero crossings of the sinusoid at the output of filter 15 the instability would occur for odd multiples of 180° phase shift. To avoid this type of unstable phase comparator operation, apparatus in accordance with the present invention advantageously selects impulses from the output of impulse former 11 to trigger the standard side of bistable phase comparator 24.

Differentiator and rectifier 20 develops a positive voltage impulse during the positive-going transistions in waveform (d) shown in FIG. 2 and triggers the variable monostable multivibrator 21 into operation. The operation of monostable multivibrator 21 is illustrated in waveform (h) of FIG. 2 where the positive pulses indicate operation of the monostable multivibrator in its unstable state and transition 37 indicates the return to its stable mono- Advantageously, the length of time during which monostable multivibrator 21 remains in its unstable state can be changed by the operator in discrete steps, such that transition 37 can be made to occur in the time interval between any two adjacent impulses from impulse former 11.

Simultaneously with its return to steady state, multivibrator 21 triggers pulse generator 22 which provides a pulse at its output shown in waveform (i) of FIG. 2, equal in width to the time interval $\Delta t$, between adjacent impulses in waveform (a) of FIG. 2. The pulse from generator 22 activates gate 23 so as to allow the impulse presented by impulse former 11 to the input of the gate, during the pulse interval of $\Delta t$, to be passed to the standard side of bistable phase comparator 24, is shown in waveform (j) of FIG. 2. Consequently, by changing the position of transition 37, the operator can select one impulse from impulse former 11 during each cycle of waveform (e) in FIG. 2 to trigger the standard side of phase comparator 24. The specific impulse is selected by the operator to be about midway between impulses 38 from zero crossing detector 34, for example impulse 39 shown in waveform (j) of FIG. 2. Accordingly, the bistable phase comparator is always operated close to its highly stable 50% duty cycle, and the full scale deflection of meter 25 need only indicate phase differences which produce deviations from 50% duty cycle corresponding to the time interval, $\Delta t$, between two adjacent impulses from impulse former 11. Since the frequency spread between sidebands ($\Delta \omega$) has been maintained constant, meter 25 may be calibrated directly in terms of envelope delay, $\Delta \Phi / \Delta \omega$.

The measurement of envelope delay distortion is begun at a first frequency from oscillator 17; monostable multivibrator 21 is adjusted until meter 25 reads on scale. Oscillator 17 is changed to a second frequency; the change in the reading on meter 25 and the number of discrete steps through which multivibrator 21 must be changed to provide an on scale reading provide a measurement of the envelope delay distortion. In this regard it should be noted that it is actually the accurately spaced impulses from impulse former 11 which provide the known steps in envelope delay on the standard side of phase comparator 24, and not the positioning of transistion 37. Monostable multivibrator 21 has a rather lenient stability requirement in that to select the $k$th pulse from waveform (a) in FIG. 2 after it has been triggered to its unstable state, transition 37 can occur at any time in the time interval between the $(k-1)$ and $k$th impulse of waveform (a).

A much less expensive and more compact apparatus can be constructed if the apparatus is permitted to have delay distortion within itself, that is, delay distortion which is measured by a so-called back-to-back measurement connecting output 19 directly to input 27. Unfortunately, this would ordinarily mean that the operator must substract these back-to-back readings from any readings that he observes when measuring a system or network. In the present invention, no such subtraction of readings is required since a circuit means is provided whereby the effects of internal delay distortion are eliminated. The circuit which accomplishes this result is indicated on FIG. 1 by compensator 26 connected between high frequency oscillator 17 and meter 25.

Figure 5:
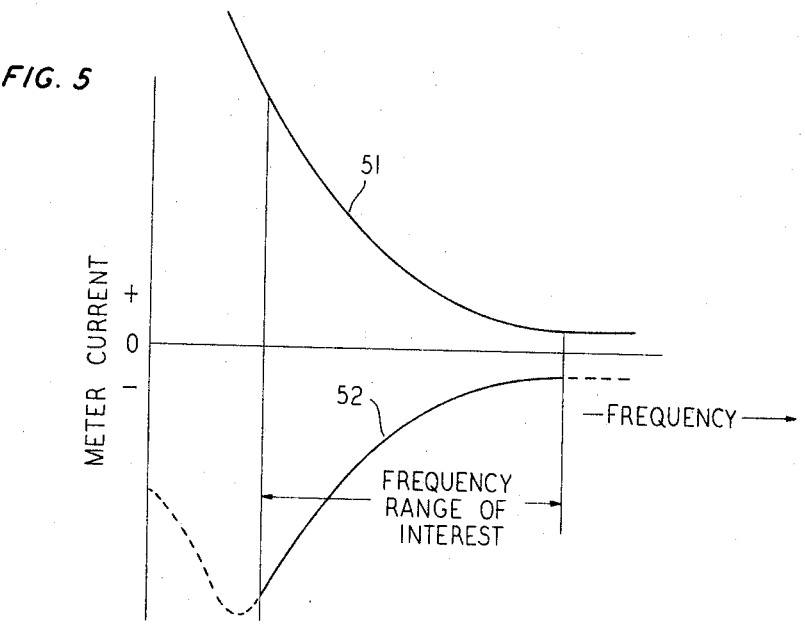
FIG. 5 is a plot of meter current versus frequency useful in explaining the operation of the circuit of FIG. 4.

Referring now to FIG. 5, curve 51 is a plot of meter current versus frequency which results from the internal delay distortion of one preferably type of measuring apparatus. Compensator 26 contains a gain shaping network plus rectification means which provides a current equal and opposite to curve 51 throughout the frequency range of interest as shown in FIG. 5 by curve 52. One circuit arrangement which will provide the required gain shape and rectification is shown in FIG. 4.

Figure 4:
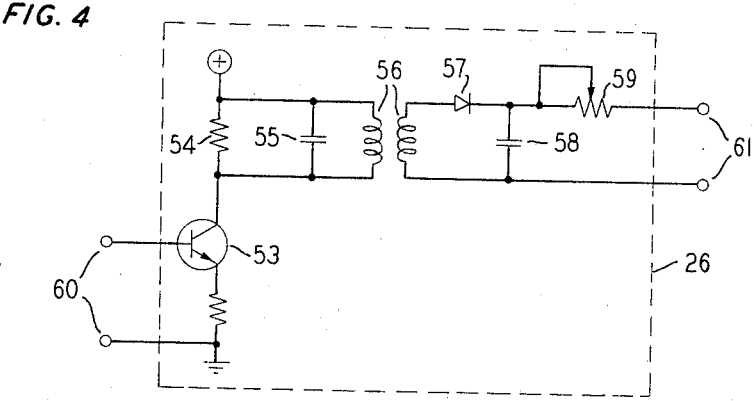

In FIG. 4, transistor 53 is connected in a common emitter arrangement with its base connected to input terminal 60 which, in turn, is connected to high frequency oscillator 17. The collector of transistor 53 feeds a load impedance comprising a resonant circuit consisting of capacitor 55 in parallel with the inductance of transformer 56, in parallel with the Q-modifying resistor 54. The output of transformer 56 is coupled through rectifying diode 57 to capacitor 58. The direct-current potential which appears across capacitor 58 is directly proportional to the gain presented by transistor 53 to signals which are applied to input 60, this gain in turn being dependent on the magnitude of the load impedance in the collector circuit of transistor 53. The potential across capacitor 58 is connected through adjustable resistance 59 to terminals 61 which, in turn, are connected directly across meter 25 with the proper polarity such the the current introduced in the meter by this potential is equal and opposite to the current introduced by the internal delay distortion of the measuring apparatus. It has been found experimentally that selection of capacitor 55 such that its resonance with transformer 56 occurs at a frequency slightly below the lowest frequency of interest provides the proper compensation shown in curve of FIG. 5. This technique of compensation is of course not limited to the specific network and rectification means shown here.

In the embodiment of the invention shown in FIG. 1, the phase comparison by bistable phase comparator 24 is performed at the same rate or frequency as the low frequency signal applied to amplitude modulator 16. To do so, zero crossing detector 34 provides voltage impulses at the negative-going crossing of each cycle of the 83⅓ cycle per second sinusoid supplied by filter 33. All known zero crossing detectors have a limited phase accuracy in detecting the zero crossing. The microsecond error introduced by this phase uncertainty will decrease as the frequency at which the detector operates is increased. Accordingly, it would be advantageous if zero crossing detector 34 were caused to operate at a frequency higher than 83⅓ cycles per second.

Figure 6:
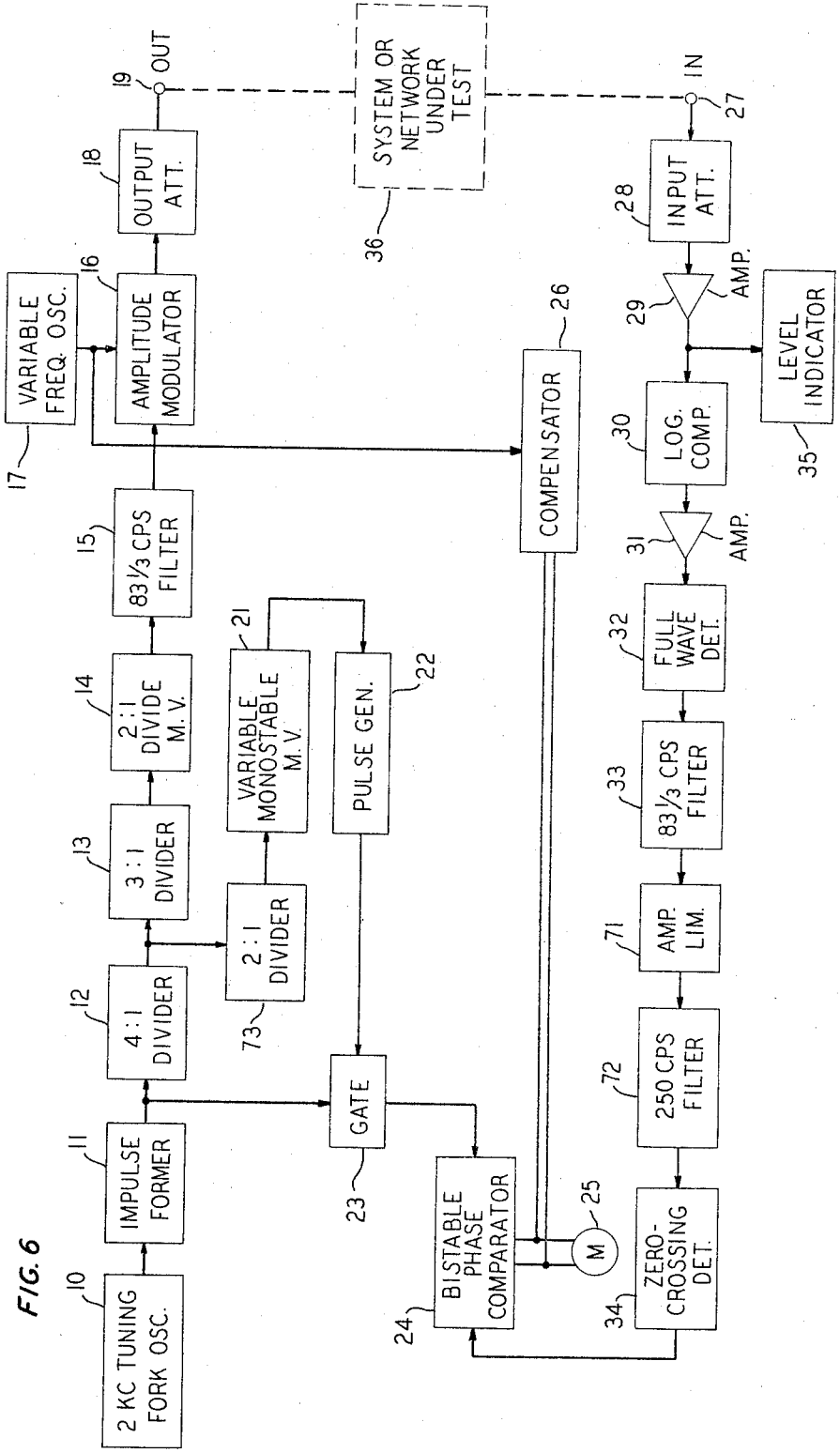
FIG. 6 is a block diagram of another embodiment constructed in accordance with the present invention.

In FIG. 6, a block diagram of an embodiment of this invention is shown wherein the high resolution to phase irregularities is still maintained by modulating amplitude modulator 16 by the low frequency signal 83⅓ cycles per second, but the zero crossing detector operates at 250 cycles per second, thereby causing a decrease in the microsecond error introduced by the phase inaccuracy of the zero crossing detector. Referring now to FIG. 6, the low frequency modulating signal at the output of filter 15 is produced in exactly the same way as discussed hereinabove in connection with FIG. 1. This low frequency signal is caused to amplitude modulate the high frequency carrier signal by way of modulator 16, and the modulated signal is passed by way of output terminal 19 to the system or network to be measured. After being received at input terminal 27, the signal is processed by circuits identical to those described hereinabove in connection with FIG. 1 up to the point where the phase-shifted low frequency signal is produced at the output of filter 33. Amplitude limiter 71 changes the sinusoidal 83⅓ cycle per second signal to a quasi-square wave signal of the same frequency. Narrow-pass filter 72 extracts the third harmonic from this quasi-square wave signal to produce at its output a 250-cycle per second sinusoidal signal frequency-locked to the 83⅓ cycle per second sinusoid. Zero crossing detector 34 produces voltage impulses at the negative-going zero crossing of the 250 cycle per second sinusoid and passes these impulses to one side of the bistable phase comparator 24.

Gate 23 must now, of course, deliver impulses to the other, or standard, side of bistable phase comparator 24 at a 250 pulse per second rate. To do so, variable monostable multivibrator 21 instead of being triggered at a 83⅓ pulse per second rate as in FIG. 1, is triggered at a 250 pulse per second rate by virtue of the 8:1 division provide by 4:1 divider 12 and newly added 2:1 divider 73. In all other respects, operation of the apparatus shown in FIG. 6 is identical to that shown in FIG. 1. With oscillator 17 at a first frequency, monostable multivibrator 21 is adjusted until gate 23 presents a pulse from impulse former 11 which operates phase comparator 24 with meter 25 on scale. After changing oscillator 17 to a second frequency, the number of steps through which multivibrator 21 must be changed to obtain an on-scale reading plus the change in readings on meter 25 provides the measurement of envelope delay distortion.

What has been described hereinbefore are specific illustrative embodiments of the principles of the present invention. It is to be understood that numerous other arrangements of circuits and different components may be utilized with equal advantage. For example, any source of accurately spaced impulses may be substituted for oscillator 10 and impulse former 11. In addition, gate 23 can be operated by numerous other types of circuits so long as the proper synchronism is maintained with the source of accurately spaced impulses. It should also be obvious to those skilled in the art that although specific illustrations have been provided for the logarithmic compressor and the compensation circuit, numerous other circuits well known in the art may be substituted therefore with equal advantage.

Accordingly, it is to be understood that the above-described arrangements are merely illustrative of the application of the principles of the present invention, and numerous modifications thereof may be devised by those skilled in the art without departing from the spirit and scope of the invention.

What is claimed is:

1. Apparatus for measuring the envelope delay distortion of a system comprising means for generating a train of accurately spaced voltage impulses, means responsive to said voltage impulses for producing a low frequency signal having a period which is an integral multiple of the voltage impulse spacing, means for generating variable frequency carrier signal, means for amplitude modulating said carrier signal by said low frequency signal, output means for coupling the resulting modulated signal to said system to be measured, input means for receiving the modulated signal from said system, means for demodulating the received modulated signal to provide a received low frequency signal, means for producing a second train of voltage impulses each of which occurs at a predetermined point in phase of said received low frequency signal, a bistable circuit means having two inputs one of which is connected to receive said second train of voltage impulses, gating means for coupling selected impulses from said first-mentioned generating means to the other input of said bistable circuit means, and means responsive to the duty cycle of said bistable circuit means for indicating the envelope delay of said system for each frequency of said variable frequency carrier signal.

2. Apparatus as defined in claim 1 wherein the input means for receiving the modulated signal includes means for maintaining the peak-to-trough amplitude of said received modulated signal at a substantially constant value.

3. Apparatus as defined in claim 1 wherein the indicating means includes means coupled to said carrier signal generating means for eliminating the effects of envelope delay distortion within the measuring apparatus.

4. Apparatus as defined in claim 1 wherein said gating means includes means for producing a pulse of changeable width, the trailing edge of said pulse being instrumental in selecting the impulses from said first-mentioned impulse generating means.

5. Apparatus as defined in claim 4 wherein said gating means includes means coupled to said low frequency signal producing means for triggering said pulse producing means at a rate equal to the frequency of said low frequency signal.

6. Apparatus as defined in claim 4 wherein said gating means includes means coupled to said low frequency signal producing means for triggering said pulse producing means at a rate equal to an integral multiple of the frequency of said low frequency signal.

7. An apparatus for measuring the phase shift encountered in a system by a low frequency signal comprising means for generating a train of accurately spaced voltage impulses, divider means for producing said low frequency signal in response to said voltage impulses, means for coupling said low frequency signal to the input of said system, means for recovering a phase-shifted low frequency signal from the output of said system, means for producing a second train of voltage impulses at predetermined phase points of said phase-shifted low frequency signal, a bistable circuit means for indicating the amount of phase shift encountered, said bistable circuit means having two inputs one of which is connected to respond to said second train of voltage impulses, and gating means responsive to said divider means for coupling selected voltage impulses from said generating means to the other input of said bistable circuit means at the same rate as said second train of voltage impulses.

8. An apparatus as defined in claim 7 wherein said gating means includes means for producing a pulse of changeable width in response to said divider means, the trailing edge of said pulse being instrumental in selecting the impulses from said first-mentioned impulse generating means.

9. An apparatus as defined in claim 8 wherein said gating means includes means coupling said pulse producing means to a point in said divided means such that said gating means couples selected impulses at a rate equal to the frequency of the said low frequency signal.

10. An apparatus as defined in claim 8 wherein said gating means includes means coupling said pulse producing means to a point in said divider means such that said gating means couples selected impulses at a rate equal to an integral multiple of the frequency of said low frequency signal.

11. In an apparatus wherein the phase shift encountered by a low frequency signal is measured with a circuit means sensitive to time-positioning of voltage impulses, said circuit means having two inputs one of which is triggered by impulses at predetermined phase points in the phase-shifted low frequency signal; means for triggering the other input of said circuit means comprising means for generating a train of accurately spaced voltage impulses from which said low frequency signal is derived, said train having a time interval between adjacent impulses equal to $1/n$ of the period of said low frequency signal where $n$ is an integer greater than one, gating means for selectively coupling the impulses from said generating means to the other input of said circuit means at the same rate as the impulses delivered to said one input.

12. In an apparatus for measuring envelope delay distortion of a system wherein the difference in phase shift encountered by two sidebands of an amplitude modulated carrier in passing through the system is measured with bistable circuit means having two inputs one of which is connected to receive voltage impulses at predetermined phase points of the modulating signal which prduced the sidebands; means for coupling the phase-shifted modulated carrier to the other input of said bistable circuit means comprising adjustable attenuator means connected to receive said phase-shifted modulated carrier and to provide a signal level at its output with a predetermined range, means connected to said attenuator means for providing a signal at its output having a constant peak-to-trough amplitude for all signal levels within said predetermined range, detector means for amplitude demodulating the phase-shifted modulated carrier having a constant peak-to-trough amplitude, filtering means for rejecting all demodulation products except a desired low frequency signal, and means for providing voltage impulses to the other input of said bistable circuit means at predetermined phase points of said desired low frequency signal.

13. In an apparatus as defined in claim 8, the means for providing a signal at its output having a constant peak-to-trough amplitude including two oppositely poled parallel diodes.

14. In combination, a source of carrier signal of changeable frequency, means for amplitude modulating the carrier signal with a stable lower frequency signal, an output terminal, means for connecting the modulated signal to said output terminal, an input terminal, demodulation means connected to said input terminal for deriving a signal when said input terminal is connected to receive the modulated signal from said output terminal, bistable circuit means having two inputs and a direct-current voltage output indicative of its duty cycle, means connected to one input of said bistable circuit means for triggering the latter means at predetermined phase points of said stable lower frequency signal, means connected to the other input of said bistable circuit means for triggering the latter means at predetermined phase points of said derived signal, current sensitive indicating means connected to respond to said direct-current voltage output, and compensation means connected between said carrier source and said indicating means for supplying current to the latter means substantially equal and opposite to current provided by said bistable circuit means at each carrier frequency when said output terminal is directly connected to said input terminal.

15. A combination as defined in claim 10 wherein said compensation means includes a network means having a gain proportional at each carrier frequency to the current provided by said bistable circuit means when said output terminal is directly connected to said input terminal, and rectifier means for converting the output of said network means to a D.C. current.

16. A combination as defined in claim 11 wherein said network means includes a capacitor-inductor resonant circuit in combination with a resistor for modifying the Q of said resonant circuit.

17. Apparatus for measuring the envelope delay distortion of a system having two ports, said apparatus comprising a carrier source of changeable frequency, a stable frequency source, impulse former means for producing an impulse during each cycle of said stable frequency, means for deriving a subharmonic of said stable frequency, means for amplitude modulating said carrier by said subharmonic to produce a modulated signal having a carrier and two sidebands, means for coupling the modulated signal to one port of said system, demodulation means, means for connecting the other port of said system to said demodulation means, band-pass filtering means for rejecting substantially all demodulation products except a phase-shifted signal having the same frequency as said subharmonic, circuit means having two inputs sensitive to the time-positioning of impulses presented to said two inputs, means for providing one input of said circuit means with voltage impulses at predetermined phase points of said phase-shifted signal, means responsive to said divider means for coupling selected impulses from said impulse former means to the other input of said circuit means, and means responsive to said circuit means for indicating a change in the differential phase shift encountered by said two sidebands with a change in the frequency of said high frequency carrier.

18. Apparatus as defined in claim 17 wherein said means for coupling selected impulses includes means for producing a pulse having a width which is changeable in distinct steps, and gating means for coupling an impulse from said impulse former means during a fixed interval after the pulse of changeable width.

19. Apparatus as defined in claim 18 wherein said means for coupling selected impulses includes means for coupling said pulse producing means to a point in said divider means which causes the gating means to operate at a rate equal to the frequency of said subharmonic.

20. Apparatus as defined in claim 19 wherein said means for coupling selected impulses includes means for coupling said pulse producing means to a point in said divider means which causes the gating means to operate at a rate equal to an integral multiple of the frequency of said subharmonic.

21. Apparatus for measuring envelope delay distortion of a system having two ports, said apparatus comprising a source of stable frequency, means for producing a first train of voltage impulses each at a predetermined phase of each cycle of said stable frequency, divider means for producing a second train of voltage impulses, means for producing a square wave in response to said second train, means for producing a low frequency signal by extracting the fundamental sinusoid from said square wave, a carrier source of variable frequency, means for modulating said high frequency carrier by said low frequency signal to produce a modulated signal having a carrier and two sidebands, means for coupling said modulated signal to one port of said system, adjustable attenuator means coupled to the other port of said system, means for indicating when the signal level at the output of said attenuator mean is within a predetermined range, means having a substantially logarithmic gain function for providing a modulated signal having a constant peak-to-trough amplitude for all signal levels within said predetermined range, means for demodulating said signal having a constant peak-to-trough amplitude, band-pass filtering means for rejecting substantially all demodulation products except a phase-shifted low frequency signal, a bistable phase comparator having two inputs and an output rectangular voltage waveform whose direct-current component is indicative of its duty cycle, means for triggering one input of said bistable phase comparator at predetermined phase points of said phase-shifted low frequency signal, means for selectively coupling impulses from said first train of voltage impulses to said other input at the same rate as said one input is triggered, means responsive to said output direct-current component for indicating changes in the differential phase shift encountered by said sidebands in passing through said system as said carrier frequency is changed, and means connected between said carrier source and said indicating means for eliminating those indicated changes caused by the internal envelope delay distortion of said apparatus.

22. Apparatus as defined in claim 21 wherein said means for eliminating indicated changes includes an amplifier means connected to said carrier source and having a gain characteristic dictated by the internal envelope delay distortion of said apparatus, and a rectifying means for providing a D.C. current proportional to the output of said amplifier means.

23. Apparatus as defined in claim 22 wherein the means for selectively coupling impulses to said other input includes a variable monostable multivibrator operative to its unstable state for an interval of time which is changeable in discrete steps, and a gating means for coupling one impulse from said first train of voltage impulses to said other input of said bistable phase comparator in response to said monostable multivibrator returning to its stable state.

References Cited by the Examiner
UNITED STATES PATENTS

| | | | |
|---|---|---|---|
| 2,717,358 | 9/1955 | Munster | 324—68 |
| 2,866,157 | 12/1958 | Casabona | 324—68 |
| 2,877,416 | 3/1959 | Grisdale | 324—83 |
| 2,977,538 | 3/1961 | Secretan | 324—85 X |
| 3,096,480 | 7/1963 | Pihl | 324—89 X |
| 3,187,262 | 6/1965 | Crane | 328—133 |

WALTER L. CARLSON, *Primary Examiner.*

E. E. KUBASIEWICZ, *Assistant Examiner.*